United States Patent [19]
Andressen

[11] Patent Number: 5,272,351
[45] Date of Patent: Dec. 21, 1993

[54] DIFFERENTIAL POLARIZATION LADAR

[75] Inventor: C. Clifton Andressen, Clearwater, Fla.

[73] Assignee: Hercules Incorporated, Wilmington, Del.

[21] Appl. No.: 819,283

[22] Filed: Jan. 13, 1992

[51] Int. Cl.⁵ .............................................. G01N 21/86
[52] U.S. Cl. .................................... 250/561; 250/225; 356/5; 359/156
[58] Field of Search .................. 250/561, 216, 225; 356/5, 4, 6; 372/103; 359/181, 156

[56] References Cited

U.S. PATENT DOCUMENTS

| | | | |
|---|---|---|---|
| 4,025,194 | 5/1977 | Teppo | 356/5 |
| 4,036,557 | 7/1977 | Christensen | 356/28 |
| 4,270,862 | 6/1981 | Hewitt | 356/5 |
| 4,333,008 | 6/1982 | Misek | 250/225 |
| 4,515,471 | 5/1985 | Eden | 356/5 |
| 4,844,593 | 7/1989 | Parker et al. | 350/400 |
| 4,902,125 | 2/1990 | Keene et al. | 356/4 |
| 4,902,127 | 2/1990 | Byer et al. | 356/5 |
| 4,919,532 | 4/1990 | Mocker et al. | 356/28.5 |

OTHER PUBLICATIONS

Kock, W. E., Circular Polarization in Certain Laser and Holography Applications; Applied Optics, Jul. 1975, vol. 14, No. 7, pp. 1471-1472.

Primary Examiner—David C. Nelms
Assistant Examiner—T. Davenport
Attorney, Agent, or Firm—Mark Goldberg

[57] ABSTRACT

The present invention provides a long range LADAR (Laser Detection and Ranging), that employs in combination a 1.32 micron, Q-switched, diode-pumped Nd:YLF laser whose output beam is linearly polarized. A quarter-wave plate is positioned in front of the laser such that the laser's (e.g. vertical)polarized light is converted to right circular polarization. Reflection from a specular surface returns left circular polarized light. A second quarter-wave plate transforms the left circular polarized light to horizontally polarized light which is then propagated through a beam splitter to two Gallium Arsenide Avalanche Photo-Diode detectors. This invention provides both substantial reduction in eye injury potential and good transmission in the atmosphere while improving scattering performance.

19 Claims, 6 Drawing Sheets

DIFFERENTIAL POLARIZATION LADAR

BACKGROUND OF THE INVENTION

1. Field of the Invention

This invention relates to long-range, infrared, solid-state LADARs (Laser Detection and Ranging). More particularly, this invention relates to differential polarization LADARs that are as safe as possible to the human eye.

2. Description of the Background Art

Polarization can be used to improve a LADAR's ability to detect objects. Specifically, if a polarized beam is transmitted, the return beam polarization is unchanged by refection from a specular target. However, most targets are diffuse (non-specular) and therefore scatter polarized light into random polarizations. The return light can be split into vertical and horizontal polarization by a polarization beam splitter, and by use of dual detectors the ratio of random to specular return energy can be detected.

The targets of interest for most LADARs are often vehicles, which are typically painted metal objects. The reflectance of smooth metal is polarization preserving. Metal surfaces with a thin layer of paint will result in a partially polarization preserving reflectance. The variation of polarization characteristics allows classification of objects detected by the LADAR. By measuring the return energy with a vertical and a horizontal polarization detector, the relative strength of each can be determined. U.S. Pat. No. 4,333,008 entitled "Polarization Coded Doublet Laser Detection System" discloses such techniques.

This invention, as described below in detail, involves modifying the differential polarization technique described above to employ circular polarization. More particularly, the unique aspect of circular polarization light (which can be either right or left hand circularly polarized) is that reflection from a specular target reverses the sense of the circular polarization. Thus, upon reflection from a specular target, a right hand circularly polarized light beam is reversed in direction to a left hand circularly polarized light beam.

As is well known in the art, circularly polarized light is produced by the use of a quarter-wave plate. More specifically, the quarter-wave plate transforms linearly polarized light to, in essence, two bundles of light propagating in the same direction, linearly polarized and orthogonal, and shifted in phase by a quarter wavelength or 90 degrees. The superposition of the two bundles of light which are linear orthogonal polarizations of equal magnitude, and which have a 90 degree phase difference between them, produces circularly polarized light.

As is also well known in the art, when the circularly polarized light is reflected from a specular target (and therefore oppositely reversed in direction of rotation as noted above) and is propagated back through the quarter-wave plate, the quarter wave plate transforms the oppositely circularly polarized light to linearly polarized light which is orthogonal to the originally transmitted linearly polarized light. For example, vertical linearly polarized transmitted light, if reflected from a specular surface, will return as horizontal linearly polarized light. As disclosed in U.S. Pat. No. 4,844,593, this property of quarter wave plates is commonly used in optical feedback isolators of laser interferometers. This property is also employed to isolate high stability oscillators from amplifiers in multiple laser systems and in computer glare reducing screens.

In another example of a prior art application, U.S. Pat. No. 4,025,194 discloses a common aperture laser transmitter/receiver. However, this system disadvantageously employs a resonator laser beam which operates at a wavelength that is hazardous to the human eye. Moreover, this system does not employ the use of a beam expander to decrease the energy density of the laser beam. The potential for damage to the human eye is therefore significantly increased. It also does not simultaneously measure the return energy in vertical and horizontal changes to detect metal objects.

The high accuracy semiconductor laser doppler velocimeter disclosed in U.S. Pat. No. 4,919,532 advantageously employs a InGaAsP laser that produces a 1.54 micrometer wavelength light beam, which is substantially eye-safe. However, experiments have shown that a InGaAsP diode laser is undesirable because of inadequate power output for long range sensing.

In addition to the disadvantages associated with the sensors described above, it is noted that with a photodiode detector, preamplifier noise sets the limit on receiver sensitivity for a small field of view sensor. Specifically, as described below in detail, by use of an avalanche photodiode, the high sensitivity, needed for long range operation, can be achieved. The avalanche photodiode amplifies the signal before the preamp noise can degrade the signal-to-noise.

Therefore, it is an object of this invention to provide an apparatus which overcomes the aforementioned inadequacies of the prior art LADARs and provides an improvement which is a significant contribution to the advancement of the LADAR art.

Another object of this invention is to employ a diode pumped, Q-switched, ND:YLF or ND:YAG laser in an imaging LADAR to achieve a compact, lightweight LADAR sensor capable of long range operation that is as eye safe as possible.

Another object of this invention is to employ an Indium Gallium Arsenide Avalanche Photo-Diode (InGaAs APD) detector in an imaging LADAR to optimize sensitivity and minimize speckle noise.

Another object of this invention is to specifically employ a 1.32 microns operating wavelength in an imaging LADAR to minimize eye hazards.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a long range, infrared, solid-state LADAR (Laser Detection and Ranging) that employs a 1.32 micron, Q-switched, diode-pumped ND:YLF laser whose output beam is linearly polarized. A quarter-wave plate is positioned in front of the laser such that the laser's (e.g. vertical) polarized light is converted to right circular polarization. Reflection from a specular surface, such as an anodized metal object, returns left circular polarized light. A second quarter-wave plate transforms the left circular polarized light to horizontally polarized light which is then propagated through a beam splitter to two Gallium Arsenide Avalanche Photo-Diode (InGaAs APD) detectors.

The advantage of a LADAR that employs a 1.32 micron, Q-switched, diode-pumped ND:YLF laser is that there is a substantial reduction in eye injury potential because the transmission of the eye of 1.32 micron energy is one-seventh that of, for example, 1.064 micron energy. There is also a substantial reduction in the absorption of 1.32 micron energy in the pigments in the eye. Furthermore, and equally important, is that fact that there is good transmission of the atmosphere at 1.32 microns, while improving scattering performance.

In addition to the foregoing advantage of employing a 1.32 micron laser beam, as noted above, with a photodiode detector, preamplifier noise sets the limit on receiver sensitivity for a small field of view sensor. However, the differential polarization LADAR receiver of the invention employs an Indium Gallium Arsenide Avalanche Photo-Diode (InGaAs APD) to improve the noise figure of the preamplifier. The InGaAs APD can provide optimum performance with far less complexity than heterodyne detection approaches, used in most long range LADARS.

Finally, it is noted that the specular reflectance of vehicles is useful as an additional clutter discriminant. The LADAR of the invention may be improved by incorporating a feature for measuring this percent specular reflectance. Specifically, this percent specular reflectance may be measured by measuring the target with circular polarized light or with linear polarized light and then measuring the ratio of the return energy's in-plane to its cross plane polarization, thereby producing a measure of specular reflectivity, with a pure specular target giving no return in the cross-plane channel and near 100% return in the in-plane channel. A diffuse target would give equal in-plane and cross-plane polarization returns.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
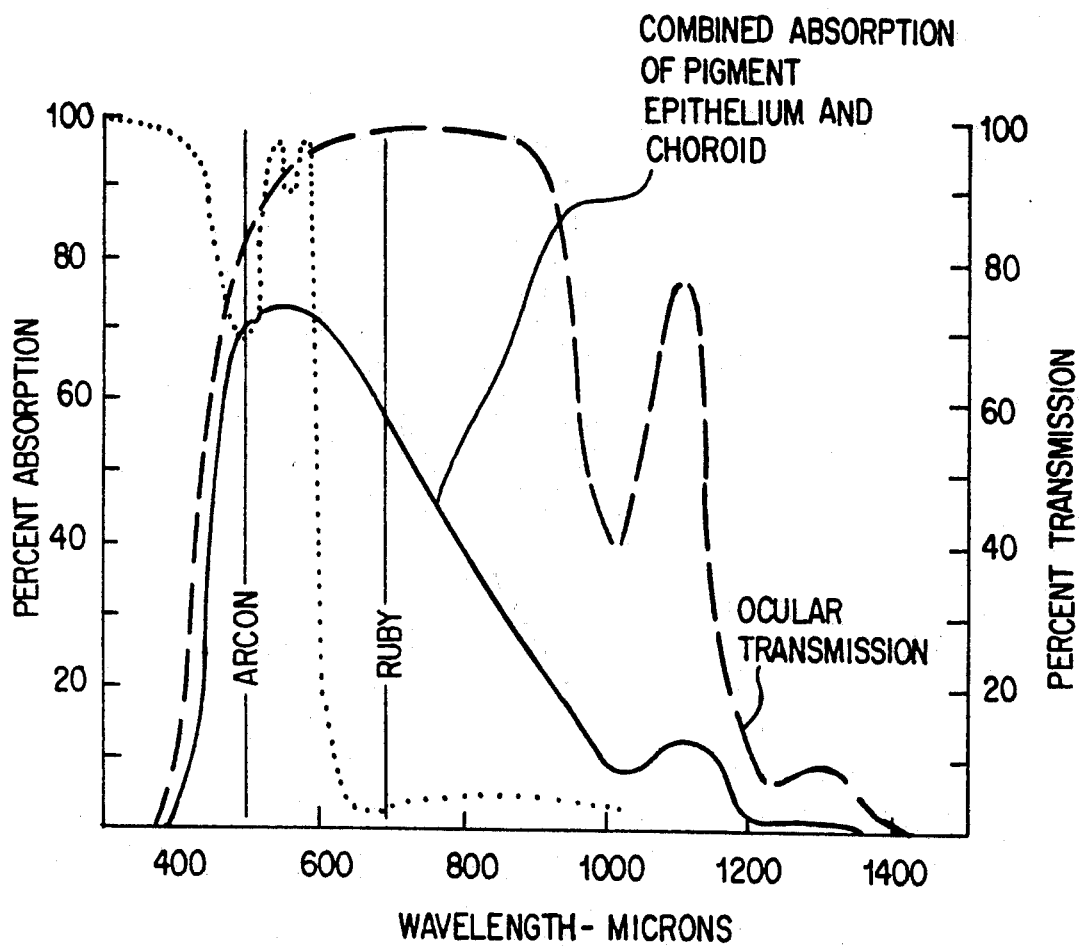
FIG. 1 graphically illustrates the absorption and transmission characteristics of the human eye at various wavelengths.

A significant issue in use of any system using a laser is eye safety. The reduction in eye injury potential is the driving factor of the LADAR of this invention in using a 1.32 microns as the operating wavelength. As shown in FIG. 1, the transmission of the eye of 1.32 micron energy is one seventh that of 1.064 micron energy. There is also a reduction of ten in absorption of 1.32 micron energy in the pigments in the eye. It is noted that a LADAR operating at a wavelength longer than 1.4 microns can be "eye safe" due to the negligible transmission of the eye at these wavelengths. Furthermore, 2.1 or 1.54 micron LADAR would be ideal from a safety perspective.

Figure 2:
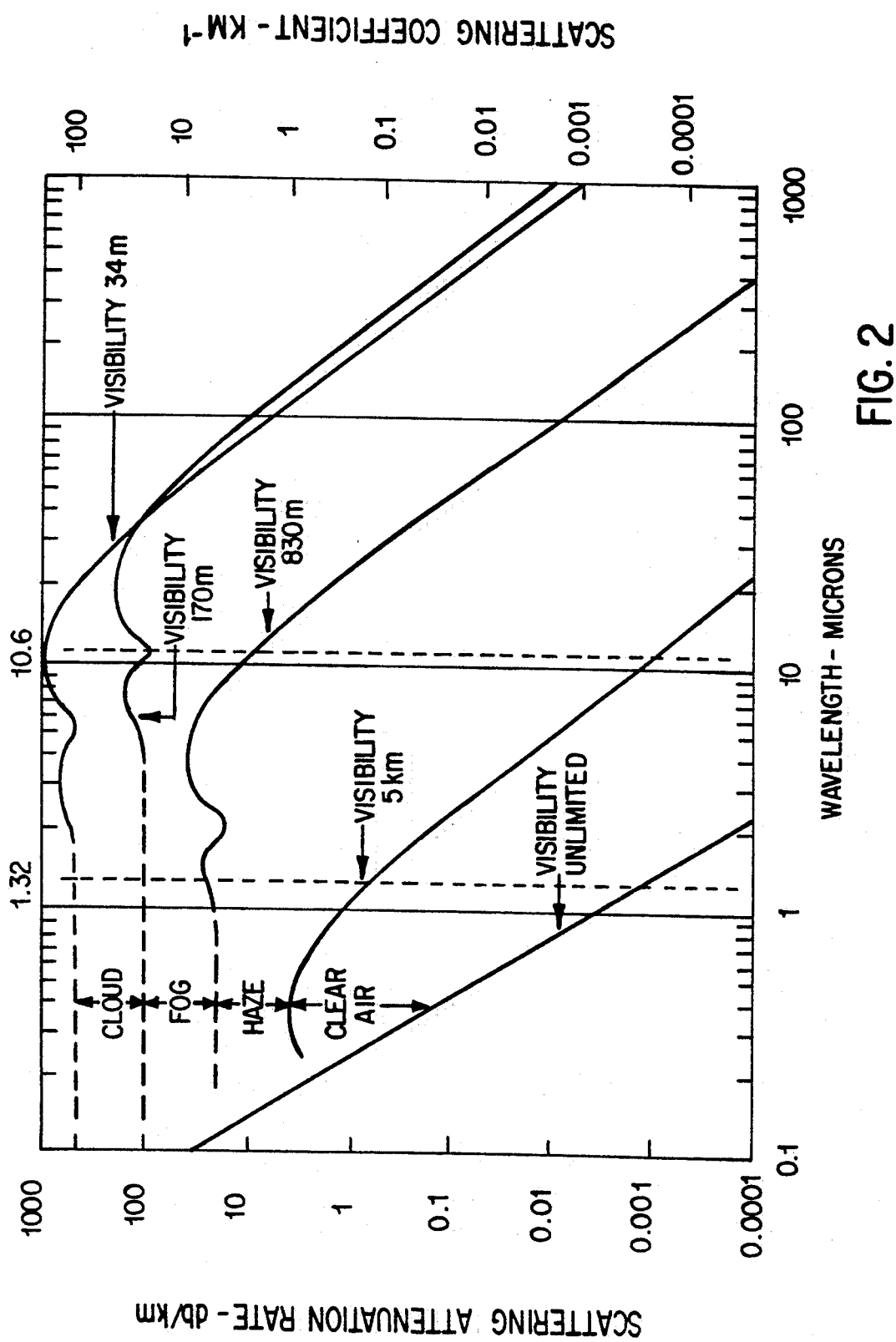
FIG. 2 graphically illustrates the atmospheric scattering attenuation rates and coefficients at various wavelengths.
Figure 4A:
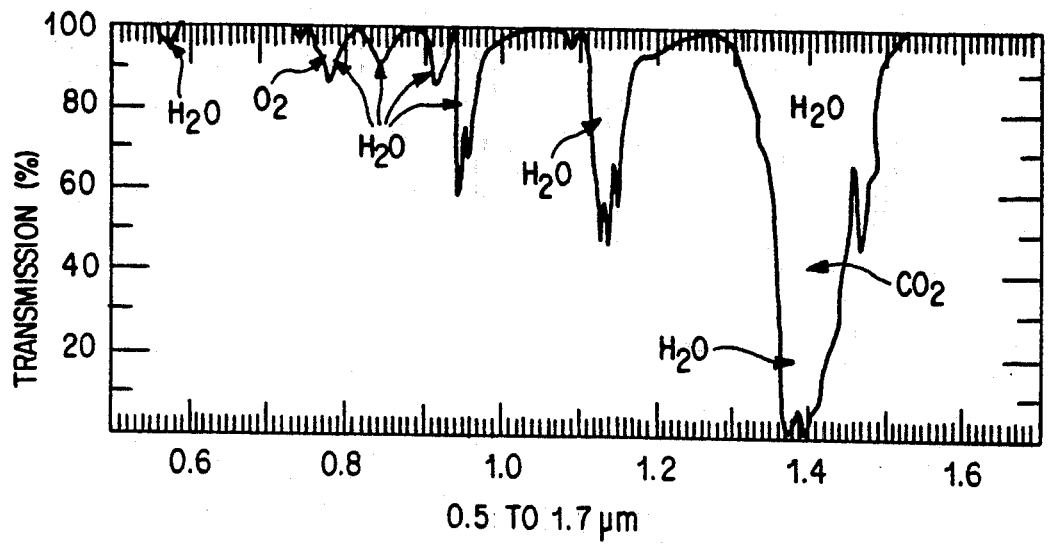
FIG. 4A and FIG. 4B graphically illustrates atmospheric transmissions at sea level over a 0.3 km path for various wavelengths.
Figure 4B:
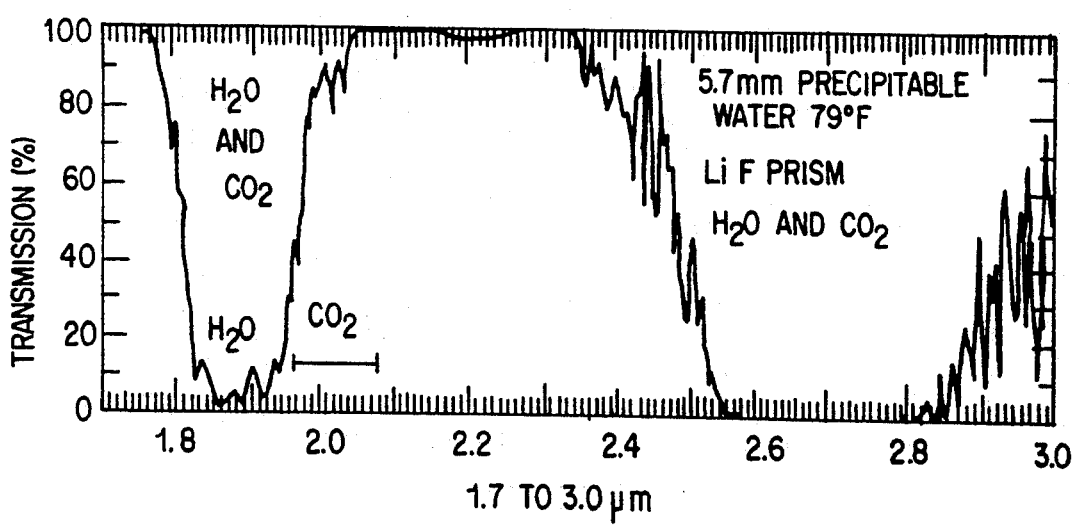

As shown in FIG. 2, the atmospheric transmission of a 1.32 micron LADAR is only slightly degraded from that obtainable at 1.064 microns. As shown in FIG. 4, the transmission of the atmosphere at 1.32 microns is at the edge of the water absorption band at 1.4 microns. The transmission over a 1 km path for nominal conditions is 75% at 1.32 microns versus 90% for 1.064. Importantly, the improved scattering performance at 1.32 microns offsets the reduced transmission in hazy conditions. Scattering losses in haze will be half that of GaAs systems operating at 0.9 microns and two thirds that of ND:YLF systems operating at 1.064. This improvement is significant for conditions where the visibility is between 2 and 5 km. The transmission at 2.1 and 1.54 microns is as good as 1.064, and scattering loss in haze is only one fourth to one half of a 1.064 system. The result is a system that is significantly better than a 1.064 micron LADAR in reduced visibility. For fog conditions (visibility of less than 1 km.) no improvement in scattering occurs as wavelength is increased for wavelengths out to 5 microns.

A LADAR using a laser operating in the 3-5 micron band would exhibit decreased losses due to scattering when visibility is in the 1 to 2 km. range. However system performance would be degraded in all conditions due to detector limitations. A 2.94 micron LADAR could be designed using an Erbium:YLF laser. The detector in such an approach would be a indium arsenide detector. This detector performs at near theoretical limits. However, noise limited performance of this detector is not comparable to InGaAs, the optimum detector for a 1.32 micron wavelength of the LADAR of this invention. This limitation is due to thermal background flux. Thus the system performance, assuming comparable laser power output and optics size, favors a 1.32 micron LADAR. In addition, it is noted that the InAs detector required for 2.94 microns would need cryogenic cooling to 77K to achieve this level of performance, thereby significantly increasing system complexity and cost. If cooled thermoelectrically, a further reduction in detector performance and range would result. Operating at wavelengths longer than 3 microns only makes the performance degradation worse.

Figure 3:
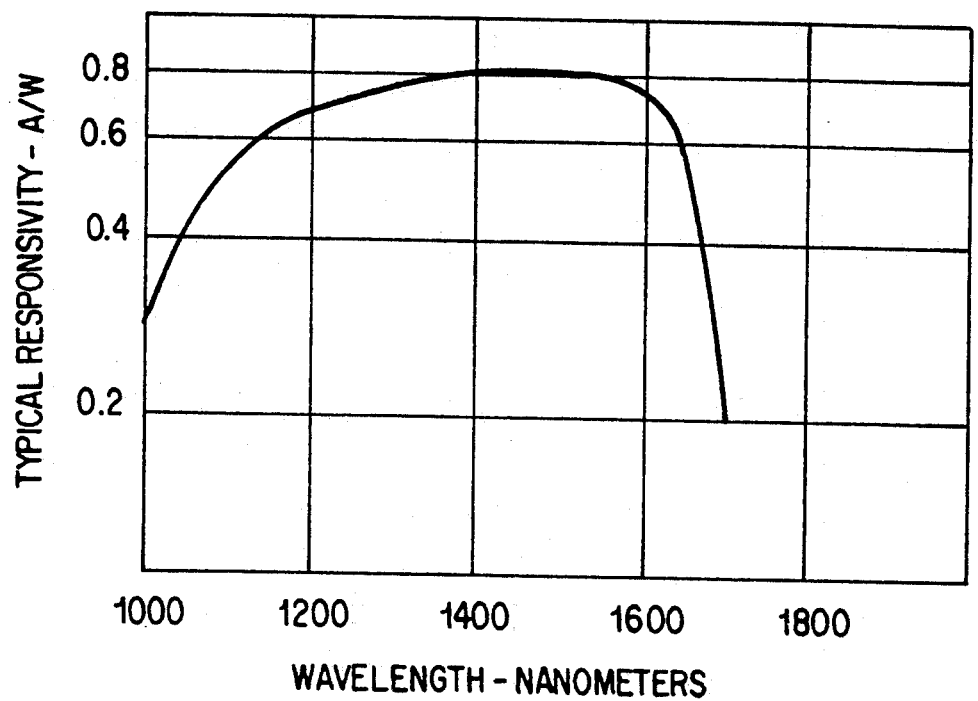
FIG. 3 graphically illustrates typical spectral responsivity characteristics at various wavelengths.

Concededly, the most desirable wavelengths for a long range compact LADAR is in the 1.5 to 1.75 microns region. This band is ideal for a LADAR system due to availability of high performance InGaAs detectors. As shown in FIG. 3, InGaAs has a peak response at 1.65 microns and is a good match for 1.32 or 1.54 micron systems. In addition to the 1.5-1.75 region, the 2.0-2.4 region is also a good potential LADAR operation region. A LADAR operating in either of these regions is eye safe and yet not be in the water absorption bands at 1.4-1.5, 1.8-2.0 or 2.4-3.0 microns (see FIG. 4). Operation in the 3.0 to 5.0 micron region results in unacceptable system performance due to background noise limits. There are unfortunately practical limitations in operating in either of these regions.

Figure 5:
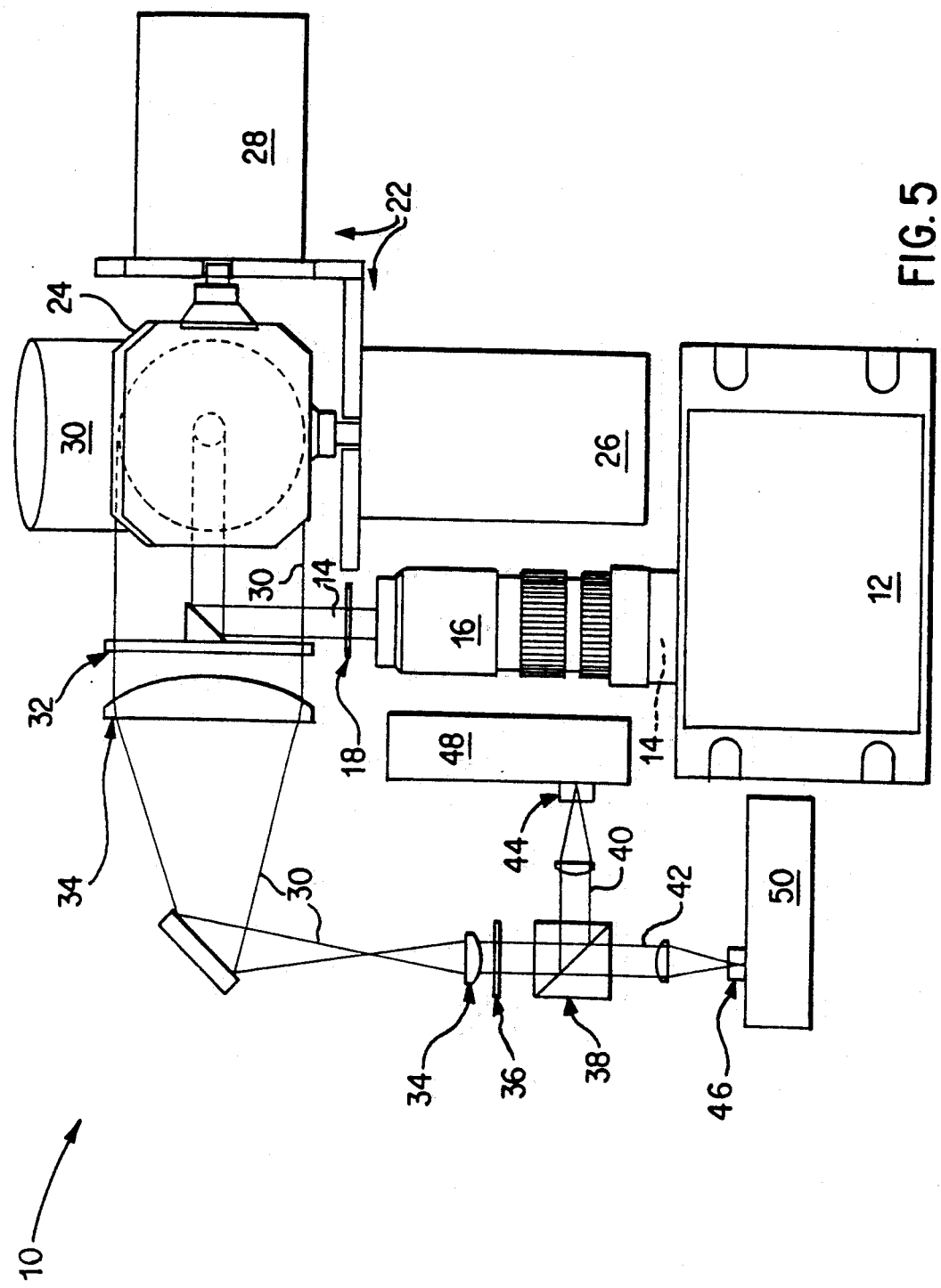
FIG. 5 illustrates the differential polarization LADAR of the invention.
Figure 7:
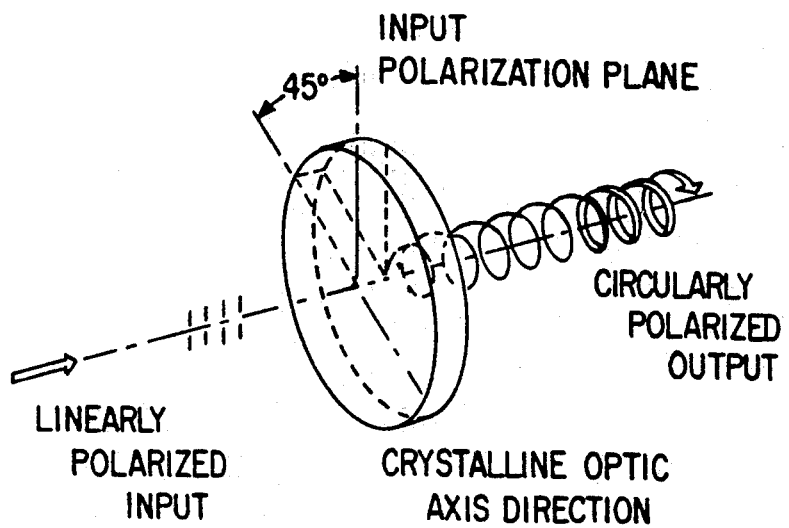
FIG. 7 illustrates a quarter-wave plate which transforms linear polarized light to light at different velocities for vertical and horizontal polarized light.

An implementation of a differential polarization LADAR of the subject invention is shown in FIG. 5. More particularly, the LADAR 10 of the invention preferably employs a ND:YLF or ND:YAG laser 12. The linearly polarized output beam 14 of the laser is expanded by means of a 10x beam expander 16. A quarter wave plate 18 is positioned in front of the beam expander 14 and functions to convert the linearly polarized beam 14 to circular polarization (see FIG. 7). For example, as shown in FIG. 7, the laser 12 may be oriented so as to produce a vertical polarized light beam which will be converted to right circular polarization by the quarter wave plate.

A beam combiner prism 20 is positioned in front of the quarter wave plate 18 to reflect the expanded beam 14 orthogonally, while preventing any reflections of return light back to the expander 16 and laser 12.

A scanner, with its associated optics, generally indicated by numeral 22, is positioned in front of the prism 20. While many embodiments may suffice, the scanner 22 may employ an X-Y platform 24 controlled by a horizontal scanner 26 and a vertical scanner 28 to project the circular polarized light to object space in a raster scan or other pattern as desired.

As noted above, upon reflection from a specular surface, the circularly polarized beam will reverse its direction of circular polarization. For example, the right circularly polarized beam noted above will, upon reflection from a specular surface, be left circularly polarized.

The return beam 30, now oppositely circularly polarized from the original output beam 14, is received by the scanner 22 and is projected through a 1.32 micron filter 32, converging optics 34, and a quarter wave plate 36. The quarter wave plate 36 converts the circular polarized beam to a linearly polarized beam which is orthogonal to the linear polarization of the output beam 14. For example, continuing with the example noted above, after passing through the quarter wave plate 36, the left circularly polarized return beam 30 will be horizontally linearly polarized (orthogonal to the vertical linear polarization of the output beam 14).

Figure 6:
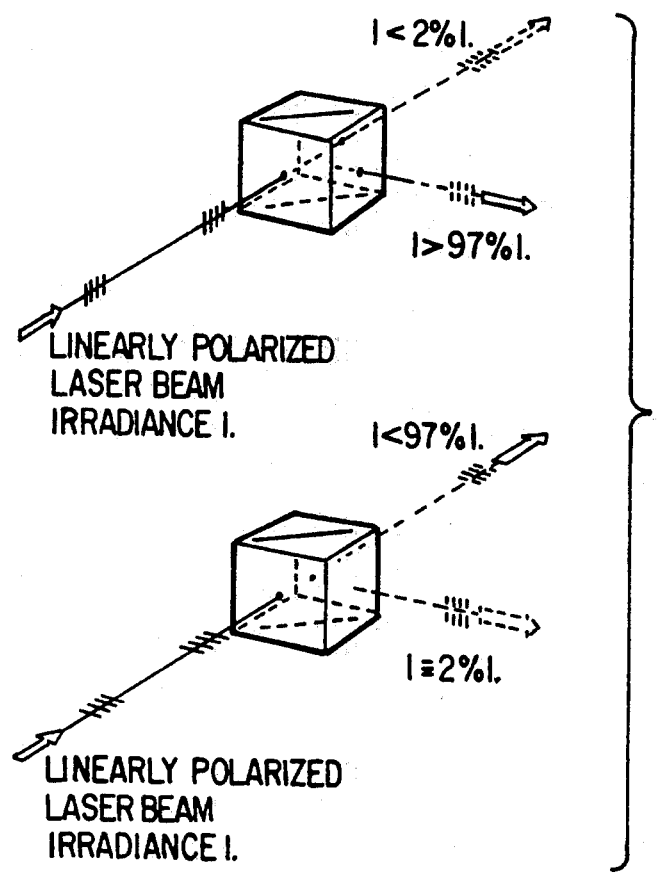
FIG. 6 illustrates a polarizing beam splitter that splits a random polarized beam into vertical and horizontal polarized beams.

A polarizing beam splitter 38 is positioned in front of the converging optics 36. The now linearly polarized return beam 30 passes through the polarizing beam splitter 38 and is split into two separate linearly polarized beams 40 and 42 (at 97% efficiency, see also FIG. 6). The beams 40 and 42 are then projected to InGaAs APD detectors 44 and 46 for processing by detector receivers 48 and 50, respectively. The relative energy of each of the beams 40 and 42 may then be measured as a clutter discriminant and to allow classification of the scanned objects.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A LADAR (Laser Detection and Ranging), comprising in combination:
   means for producing a linearly polarized output beam of energy;
   a first quarter wave plate positioned in the path of said linearly polarized output beam for converting said linearly polarized output beam to a circularly polarized output beam;
   a scanner positioned in the path of said circularly polarized output beam to project said circularly polarized output beam to object space in a desired scan pattern and for receiving a reflected circularly polarized return beam;
   a second quarter wave plate positioned in the path of said circularly polarized return beam for converting said circularly polarized return beam to a linearly polarized return beam;
   a beam splitter positioned in the path of said linearly polarized return beam to split said linearly polarized return beam into two orthogonal linearly polarized beams; and
   two detector receivers positioned in the path of said two orthogonal linearly polarized beams for detecting the relative energy of the respective said orthogonal linearly polarized beams.

2. The LADAR as set forth in claim 1, wherein said linearly polarized output beam comprises a wavelength of approximately 1.32 microns.

3. The LADAR as set forth in claim 2, wherein said means for producing a linearly polarized output beam of energy comprises a ND:YLF laser.

4. The LADAR as set forth in claim 1, further comprising a 1.32 micron filter positioned between said scanner and said second quarter wave plate.

5. The LADAR as set forth in claim 1, further comprising a beam expander positioned between said means for producing a linearly polarized output beam of light and said first quarter wave plate for expanding said linearly polarized output beam.

6. The LADAR as set forth in claim 5, further comprising a beam combiner prism positioned between said first quarter wave plate and said scanner for orthogonally projecting said linearly polarized output beam from said first quarter wave plate into said scanner.

7. A LADAR (Laser Detection and Ranging), comprising in combination:
- a 1.32 micron ND:YLF laser for producing a linearly polarized output beam of energy;
- a beam expander positioned in the path of said linearly polarized output beam to convert said linearly polarized output beam to an expanded linearly polarized output beam;
- a first quarter wave plate positioned in the path of said expanded linearly polarized output beam to convert said expanded linearly polarized output beam to a circularly polarized output beam;
- a beam combiner prism positioned in the path of said circularly polarized output beam to orthogonally project said circularly polarized output beam;
- a scanner positioned in the path of said orthogonally projected circularly polarized output beam for projecting said orthogonally projected circularly polarized output beam to object space in a desired scan pattern and for receiving a circularly polarized return beam;
- a 1.32 micron filter positioned in the path of said circularly polarized return beam to filter said circularly polarized return beam;
- converging optics positioned in the path of said filtered circularly polarized return beam for reducing said filtered circularly polarized return beam;
- a second quarter wave plate positioned in the path of said reduced circularly polarized return beam for converting said reduced circularly polarized return beam to a linearly polarized return beam;
- a polarizing beam splitter positioned in the path of said linearly polarized return beam to split said linearly polarized return beam into two orthogonal linearly polarized beams; and
- two detector receivers positioned in the paths of said two orthogonal linearly polarized beams for detecting the relative energy of respective said orthogonal linearly polarized beams.

8. A method for differential polarization LADAR (Laser Detection and Ranging), comprising the steps of:
- producing a linearly polarized output beam of energy;
- converting said linearly polarized output beam to a circularly polarized output beam;
- projecting said circularly polarized output beam to object space in a desired scan pattern;
- receiving a reflected circularly polarized return beam;
- converting said circularly polarized return beam to a linearly polarized return beam;
- splitting said linearly polarized return beam into two orthogonal linearly polarized beams; and
- detecting the relative energy of the respective said orthogonal linearly polarized beams.

9. The method as set forth in claim 8, wherein said linearly polarized output beam comprises a wavelength of approximately 1.32 microns.

10. The method as set forth in claim 9, wherein said step of producing a linearly polarized output beam of energy comprises the step of using a ND:YLF laser.

11. The method as set forth in claim 10, wherein said step of detecting comprises the step of using Indium Gallium Arsenide Avalanche Photo-Diode detectors.

12. The method as set forth in claim 11, further comprising the step of filtering said reflected circularly polarized return beam.

13. The method as set forth in claim 8, further comprising the step of expanding said linearly polarized output beam.

14. The method as set forth in claim 13, further comprising the step of orthogonally projecting said linearly polarized output beam into said scanner.

15. The method as set forth in claim 8, wherein said step of projecting comprises using a scanner having, an X—Y platform controlled by a vertical scanner and a horizontal scanner.

16. The method as set forth in claim 8, further comprising the step of reducing said reflected circularly polarized return beam.

17. A LADAR (Laser Detection and Ranging), comprising in combination:
- a means for producing a linearly polarized output beam of energy comprising a Nd:YLF laser;
- a first quarter wave plate positioned in the path of said linearly polarized output beam for converting said linearly polarized output beam to a circularly polarized output beam;
- a scanner positioned in the path of said circularly polarized output beam to project said circularly polarized output beam to object space in a desired scan pattern and for receiving a reflected circularly polarized return beam;
- a second quarter wave plate positioned in the path of said circularly polarized return beam for converting said circularly polarized return beam to a linearly polarized return beam;
- a beam splitter positioned in the path of said linearly polarized return beam to split said linearly polarized return beam into two orthogonal linearly polarized beams; and
- two detector receivers positioned in the path of said two orthogonal linearly polarized beams for detecting the relative energy of the respective said orthogonal linearly polarized beams wherein said detector receivers comprise Indium Gallium Arsenide Avalanche Photo-Diode detectors.

18. A LADAR (Laser Detection and Ranging), comprising in combination;
- a means for producing a linearly polarized output beam of energy;
- a first quarter wave plate positioned in the path of said linearly polarized output beam for converting said linearly polarized output beam to a circularly polarized output beam;
- a scanner positioned in the path of said circularly polarized output beam to project said circularly polarized output beam to object space in a desired scan pattern and for receiving a reflected circularly polarized return beam wherein said scanner comprises an X—Y platform controlled by a vertical scanner and a horizontal scanner;
- a second quarter wave plate positioned in the path of said circularly polarized return beam for converting said circularly polarized return beam to a linearly polarized return beam;
- a beam splitter positioned in the path of said linearly polarized return beam to split said linearly polarized return beam into two orthogonal linearly polarized beams; and
- two detector receivers positioned in the path of said two orthogonal linearly polarized beams for detecting the relative energy of the respective said orthogonal linearly polarized beams.

19. A LADAR (Laser Detection and Ranging), comprising in combination:
- a means for producing a linearly polarized output beam of energy;
- a first quarter wave plate positioned in the path of said linearly polarized output beam for converting said linearly polarized output beam to a circularly polarized output beam;
- a scanner positioned in the path of said circularly polarized output beam to project said circularly polarized output beam to object space in a desired scan pattern and for receiving a reflected circularly polarized return beam;
- a scanner positioned in the path of said circularly polarized output beam to project said circularly polarized output beam to object space in a desired scan pattern and for receiving a reflected circularly polarized return beam;
- a second quarter wave plate positioned in the path of said circularly polarized return beam for converting said circularly polarized return beam to a linearly polarized return beam;
- a beam splitter positioned in the path of said linearly polarized return beam to split said linearly polarized return beam into two orthogonal linearly polarized beams; and
- two detector receivers positioned in the path of said two orthogonal linearly polarized beams for detecting the relative energy of the respective said orthogonal linearly polarized beams.
- converging optics positioned between said scanner and said second wave plate.

* * * * *

UNITED STATES PATENT AND TRADEMARK OFFICE
CERTIFICATE OF CORRECTION

PATENT NO. : 5,272,351

DATED : December 21, 1993

INVENTOR(S) : C. Clifton Andressen

It is certified that error appears in the above-identified patent and that said Letters Patent is hereby corrected as shown below:

In the Claims, Col. 6, line 55, "ND:YLF laser" should read --Nd:YLF laser--;

Col. 7, line 3, "ND:YLF laser" should read --Nd:YLF laser--;

Col. 7, line 62, "ND:YLF laser" should read --Nd:YLF laser--;

Col. 9, lines 15-17 and Col. 10, Lines 1-2, delete entirely. Duplication of lines 10-14 in Col. 9;

Col. 10, line 10, delete "and"; and

Col. 10, line 14, "beams." should read --beams; and--.

Signed and Sealed this

Twenty-seventh Day of September, 1994

Attest:

BRUCE LEHMAN

*Attesting Officer*  *Commissioner of Patents and Trademarks*